(12) United States Patent
Yamamoto et al.

(10) Patent No.: US 9,086,685 B2
(45) Date of Patent: Jul. 21, 2015

(54) STEPPING MOTOR CONTROL CIRCUIT, MOVEMENT, AND ANALOGUE ELECTRONIC TIMEPIECE

(71) Applicant: Seiko Instruments Inc., Chiba (JP)

(72) Inventors: Kosuke Yamamoto, Chiba (JP); Akira Takakura, Chiba (JP); Kenji Ogasawara, Chiba (JP); Saburo Manaka, Chiba (JP); Kazumi Sakumoto, Chiba (JP); Keishi Honmura, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 366 days.

(21) Appl. No.: 13/737,032

(22) Filed: Jan. 9, 2013

(65) Prior Publication Data

US 2013/0182542 A1    Jul. 18, 2013

(30) Foreign Application Priority Data

Jan. 11, 2012  (JP) ................................ 2012-003417
Nov. 6, 2012   (JP) ................................ 2012-244674

(51) Int. Cl.
*H02P 8/00* (2006.01)
*G04B 19/04* (2006.01)
*G04C 3/14* (2006.01)
*H02P 8/38* (2006.01)

(52) U.S. Cl.
CPC ......... *G04C 3/14* (2013.01); *G04C 3/143* (2013.01); *H02P 8/38* (2013.01)

(58) Field of Classification Search
CPC .................................... G04C 3/14; H02P 8/38
USPC .................. 318/696; 368/76, 202, 64, 80
See application file for complete search history.

(56) References Cited

U.S. PATENT DOCUMENTS

| 5,889,734 A | 3/1999 | Sato ............................... 368/64 |
| 2008/0089183 A1 | 4/2008 | Manaka et al. ............... 368/202 |
| 2011/0242946 A1* | 10/2011 | Ogasawara et al. ............ 368/80 |

* cited by examiner

*Primary Examiner* — Bentsu Ro
*Assistant Examiner* — Zemenay Truneh
(74) *Attorney, Agent, or Firm* — Adams & Wilks

(57) ABSTRACT

A control circuit selects a drive pulse group corresponding to the detected voltage of a power cell from among plural drive pulse groups each including plural types of main drive pulses, and selects a drive pulse according to the detected condition of rotation of a stepping motor from among main drive pulses included in the selected drive pulse group or a correction drive pulse having larger energy than the main drive pulses. When the control circuit selects a main drive pulse initially by selecting the drive pulse group, the control circuit selects the main drive pulse having the largest energy in the selected drive pulse group. A drive pulse group selection circuit drives the stepping motor by the main drive pulse in the drive pulse group selected by the control circuit or the correction drive pulse via a main drive pulse output circuit and a correction drive pulse output circuit.

20 Claims, 9 Drawing Sheets

FIG. 3

| CONDITION | ROTATIONAL BEHAVIOR | VRs OUTPUT TIMING | T1 | T2 | T3 | OPERATION AFTER DETECTION |
|---|---|---|---|---|---|---|
| WITH DRIVING ALLOWANCE | | DETECTION TERM T1 / DETECTION TERM T2 (Vmax) / DETECTION TERM T3 (Vcomp) | 0 | 1 | 0 | NORMAL DRIVING → RANK DOWN AFTER PREDETERMINED NUMBER OF TIMES |
| NORMAL DRIVING | | DETECTION TERM T1 / DETECTION TERM T2 (Vmax) / DETECTION TERM T3 (Vcomp) | 0 | 1 | 1 | NORMAL DRIVING → RANK DOWN AFTER PREDETERMINED NUMBER OF TIMES |
| SLIGHTLY SMALL ENERGY | | DETECTION TERM T1 / DETECTION TERM T2 / DETECTION TERM T3 (Vmax, Vcomp) | 1 | 1 | 0 | NORMAL DRIVING PULSE COUNT RESET |
| SIGNIFICANTLY SMALL ENERGY | | DETECTION TERM T1 / DETECTION TERM T2 / DETECTION TERM T3 (Vmax, Vcomp) | 1 | 0 | 1 | RANK UP |
| P1 NON-ROTATION | | DETECTION TERM T1 / DETECTION TERM T2 / DETECTION TERM T3 (Vcomp) | 0 | 0 | 0 | P2 OUTPUT *PULSE UP IN CASE OF P11 TO P13 |

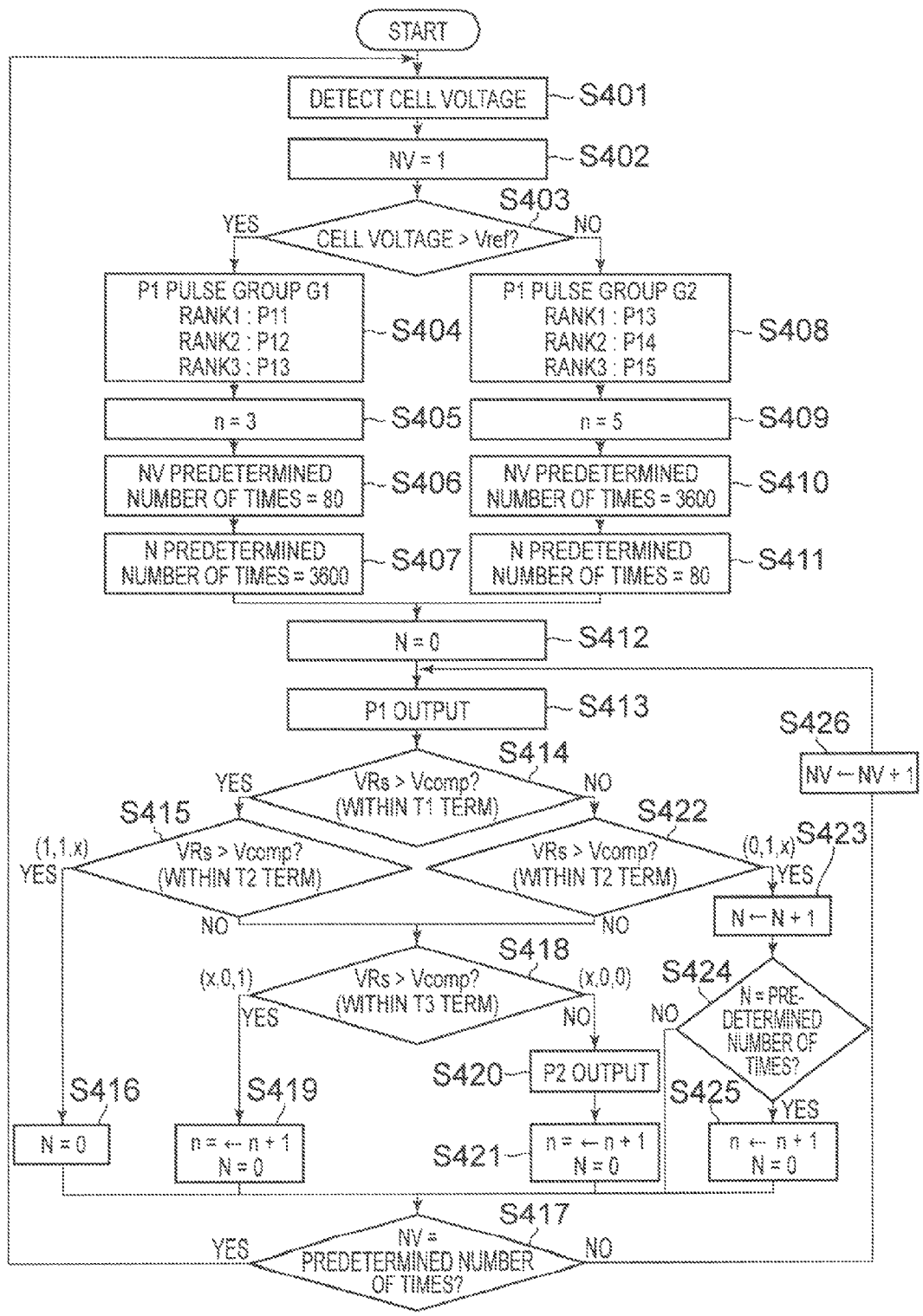

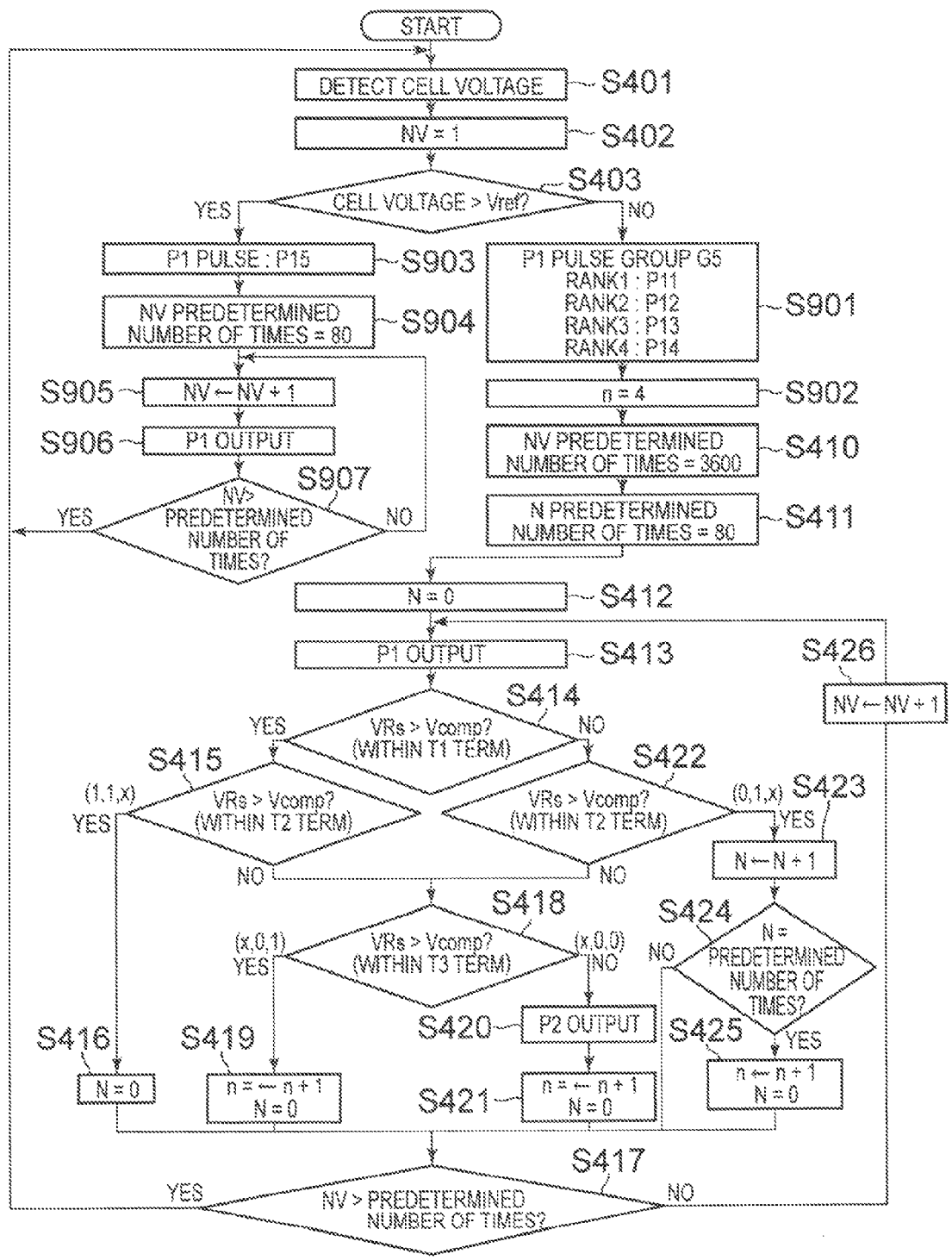

STEPPING MOTOR CONTROL CIRCUIT, MOVEMENT, AND ANALOGUE ELECTRONIC TIMEPIECE

BACKGROUND OF THE INVENTION

1. Technical Field

The present invention relates to a stepping motor control circuit configured to drive a stepping motor by selecting an adequate drive pulse from among a plurality of drive pulses, a movement provided with the above-described stepping motor control circuit, and an analogue electronic timepiece using the above-described movement.

2. Description of the Related Art

In the related art, an analogue electronic timepiece in which a stepping motor is configured to driven to rotate by selecting an adequate drive pulse according to the condition of the rotation of the above-described stepping motor has been developed.

For example, in the invention described in International Publication No. 2005/119377, there is provided a unit configured to compare and discriminate a time of day when an induced signal VRs generated by the rotation of the stepping motor is detected with and from a reference time when the stepping motor is driven to rotate at a main drive pulse Pl. Every time when the stepping motor is driven to rotate at the main drive pulse P1, the counted value of a counter is incremented by one if the time of day when the induced signal VRs is detected is earlier than the reference time, and the main drive pulse P1 is pulsed down to a main drive pulse P1 having energy one rank lower when the above-described counted value becomes a certain value, whereby the consumption current may be reduced.

However, the internal resistance of a cell used as a power supply of the analogue electronic timepiece has a property of rising abruptly in a low-temperature environment in comparison with a normal-temperature environment. In such a case, a detected cell voltage may be different significantly from a voltage actually applied to the stepping motor.

Even with a main drive pulse P1 which is sufficient for rotating the stepping motor when the cell voltage is equal to a voltage (motor voltage) applied to the stepping motor, if the the cell voltage is larger than the motor voltage, drive energy shortage may result. In such a case, the main drive pulse P1 is not capable of rotating the stepping motor, which may result in slow movement of hands of the timepiece.

In contrast, in Japanese Patent No. 3407887, there is disclosed an electronic timepiece which achieves low power consumption by creating a plurality of drive pulse groups having main drive pulses P1 of different combinations and driving a motor by selecting a drive pulse group according to an output voltage of a power supply unit.

Application of the invention described in Japanese Patent No. 3407887 is contemplated in order to solve the above-described problem, but since the invention described in Japanese Patent No. 3407887 is intended to achieve low power consumption, when one of the drive pulse groups is selected, a drive pulse having the smallest energy in the selected drive pulse group is firstly used for driving. Therefore, when the cell voltage is significantly lowered as in a case where a cell whose cell voltage varies is used, the energy of the drive pulse may run short, and hence difficulty of driving may result.

SUMMARY

It is an aspect of the present application to cause a stepping motor to rotate further reliably even when the voltage to be applied to the stepping motor varies.

According to the application, there is provided a stepping motor control circuit including: a cell as a power supply configured to supply power to at least a stepping motor, a voltage detecting unit configured to detect the voltage of the cell, a rotation detecting unit configured to detect the condition of the rotation of the stepping motor, a control unit configured to select a drive pulse group corresponding to the voltage of the cell detected by the voltage detecting unit from among a plurality of the drive pulse groups including a plurality of types of main drive pulses, and select a drive pulse according to the condition of the rotation of the stepping motor detected by the rotation detecting unit from among the plurality of types of main drive pulses included in the selected drive pulse group or a correction drive pulse having larger energy than the respective main drive pulses, and a drive unit configured to drive the stepping motor to rotate by the drive pulse selected by the control unit, wherein when the control unit selects a main drive pulse initially by selecting the drive pulse group, the control unit selects a main drive pulse other than a main drive pulse having the smallest energy from among the main drive pulses included in the selected drive pulse group.

According to the application, there is provided a stepping motor control circuit including: a cell as a power supply configured to supply power to at least a stepping motor; a voltage detecting unit configured to detect the voltage of the cell; a rotation detecting unit configured to detect the condition of the rotation of the stepping motor; a control unit configured to select a fixed drive pulse having predetermined energy or a drive pulse group from among at least one drive pulse group according to the voltage of the cell detected by the voltage detecting unit, and select a main drive pulse according to the condition of the rotation of the stepping motor detected by the rotation detecting unit from among a plurality of types of the main drive pulses included in the drive pulse group in question when the drive pulse group is selected; and a drive unit configured to drive the stepping motor to rotate by the fixed drive pulse selected by the control unit or the main drive pulse, wherein when the control unit selects a main drive pulse initially by selecting the drive pulse group, the control unit selects a main drive pulse other than a main drive pulse having the smallest energy from among the main drive pulses included in the selected drive pulse group.

According to the application, there is provided a movement including the stepping motor control circuit according to any one of those described above.

According to the application, there is provided an analogue electronic timepiece including the movement described above.

According to the stepping motor control circuit of the application, even when the voltage to be applied to the stepping motor varies, the stepping motor can be rotated further reliably.

According to the movement of the application, the analogue electronic timepiece which is capable of rotating the stepping motor further reliably even when the voltage to be applied to the stepping motor is varied may be constructed.

According to the analogue electronic timepiece of the application, since the stepping motor can be rotated further reliably even when the voltage to be applied to the stepping motor is varied, an accurate movement of hands of the timepiece is enabled.

BRIEF DESCRIPTION OF THE DRAWINGS

FIG. 3 is a timing chart of the stepping motor control circuit, a movement, and the analogue electronic timepiece common to the respective embodiments of the invention;

FIG. 4 is a flowchart of the stepping motor control circuit, the movement, and the analogue electronic timepiece according to a first embodiment of the invention;

FIG. 9 is a flowchart of the stepping motor control circuit, the movement, and the analogue electronic timepiece according to a fourth embodiment of the invention.

DESCRIPTION OF THE PREFERRED EMBODIMENTS

Figure 1:
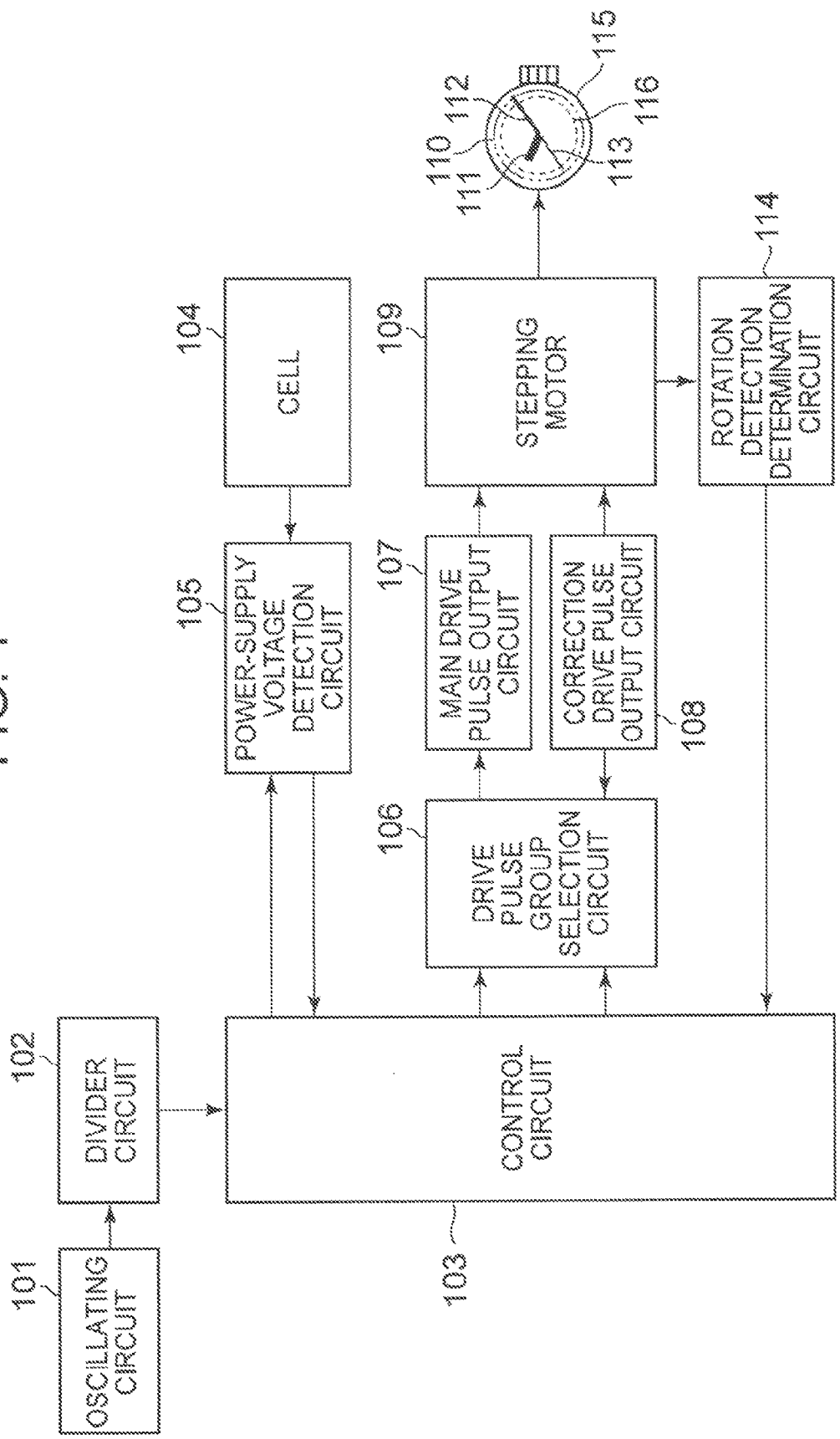
FIG. 1 is a block diagram of an analogue electronic timepiece in which a stepping motor control circuit common to respective embodiments of the invention is used.

FIG. 1 is a block diagram common to stepping motor control circuits, movements provided with the above-described stepping motor control circuits, and analogue electronic timepieces provided with the above-described movements according to the respective embodiments of the invention, illustrating an example of an analogue electronic timepiece.

In FIG. 1, the analogue electronic timepiece includes an oscillating circuit 101 configured to generate a signal of a predetermined frequency, a divider circuit 102 configured to divide frequency of the signal generated by the oscillating circuit 101 and generate a clock signal as a reference of time counting, and a control circuit 103 configured to perform various types of control such as control of a time counting operation of the above-described clock signal or respective electronic circuit elements which constitute the analogue electronic timepiece, or control that changes a drive pulse.

The analogue electronic timepiece includes a cell 104, and a power-supply voltage detection circuit 105 configured to detect a voltage of the cell 104 (cell voltage) in response to a voltage detection control signal from the control circuit 103 and output the cell voltage in question to the control circuit 103. The cell 104 is a power supply that supplies power to respective electronic components of the analogue electronic timepiece. The cell 104 functions as a power supply configured to supply power to at least the stepping motor 109.

The cell 104 is a cell whose voltage varies significantly depending on the temperature or the like and is a cell, for example, whose voltage is lowered significantly in association with temperature lowering and consumption like a low-quality SR cell.

Figure 5:
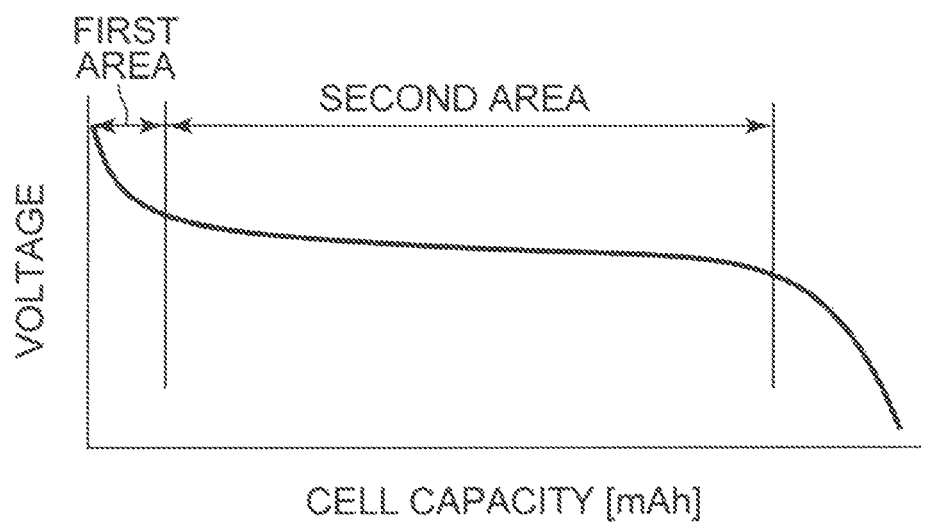
FIG. 5 is a characteristic drawing of a cell common to the respective embodiments of the invention.

FIG. 5 is a drawing illustrating an example of characteristics of the cell 104, in which a vertical axis indicates the cell voltage (V), and a lateral axis indicates the cell capacity (mAh). In FIG. 5, the cell 104 has a first area showing a large voltage variation proportion per hour and a second area showing the voltage variation proportion per hour smaller than that of the first area. The first area is an area in which the cell voltage stays in a state of exceeding a predetermined voltage (reference voltage Vref) for a predetermined period from the start of consumption of electricity of the cell. The second area is an area in which the cell voltage is lowered to or below the above-described predetermined voltage (reference voltage Vref) after the elapse of the predetermined period from the start of consumption of the electricity of the cell, and also an area in which voltage variations are small (the cell voltage is substantially the same as the reference voltage Vref). In the area after the second area, the cell voltage is lowered at a larger voltage variation proportion than that of the second area.

The analogue electronic timepiece includes a drive pulse group selection circuit 106 configured to select a drive pulse corresponding to the control signal from the control circuit 103, and output a drive pulse selection signal which indicates the selected drive pulse in question.

The control signal output from the control circuit 103 includes a drive pulse group control signal which indicates a drive pulse group selected from among a plurality of drive pulse groups prepared in advance, a main drive pulse control signal indicating an energy rank corresponding to a main drive pulse P1 selected from among a plurality of the main drive pulses P1 included in the selected drive pulse group, and a correction drive pulse control signal indicating a correction drive pulse P2. As described later, when using a fixed drive pulse having predetermined energy, the control signal output from the control circuit 103 includes a fixed drive pulse control signal indicating the fixed drive pulse.

In the drive pulse group selection circuit 106, information indicating a plurality of types of drive pulse groups prepared in advance, a plurality of types of main drive pulses P1 included in the respective drive pulse groups, a fixed drive pulse having larger energy than the respective main drive pulses P1, and a correction drive pulse P2 having energy larger than the respective main drive pulses P1 and the fixed drive pulse is stored. The respective drive pulse groups include a plurality of types of the main drive pulses P1 in different combinations.

The drive pulse group selection circuit 106 selects a drive pulse group corresponding to the above-described drive pulse group control signal from the control circuit 103, selects a main drive pulse P1 having an energy rank corresponding to the above-described main drive pulse control signal from among the plurality of types of main drive pulses P1 included in the above-described selected drive pulse group, and outputs the selected main drive pulse P1 to a main drive pulse output circuit 107. The drive pulse group selection circuit 106 outputs a correction drive pulse P2 to a correction drive pulse output circuit 108 in response to the above-described correction drive pulse control signal from the control circuit 103. The drive pulse group selection circuit 106 outputs a fixed drive pulse to the main drive pulse output circuit 107 in response to the fixed drive pulse control signal from the control circuit 103, when using the fixed drive pulse.

The analogue electronic timepiece includes the main drive pulse output circuit 107 and the correction drive pulse output circuit 108. The main drive pulse output circuit 107 drives a stepping motor 109 to rotate by the main drive pulse P1 output from the drive pulse group selection circuit 106. The correction drive pulse output circuit 108 drives the stepping motor 109 to rotate by the correction drive pulse P2 output from the drive pulse group selection circuit 106. When using the fixed drive pulse, the main drive pulse output circuit 107 drives the stepping motor 109 to rotate by the fixed drive pulse output from the drive pulse group selection circuit 106.

The analogue electronic timepiece includes the stepping motor 109 configured to be driven to rotate by the main drive pulse output circuit 107 and the correction drive pulse output circuit 108, and an analogue display unit 110 including timeof-day hands (three types of an hour hand 111, a minute hand 112, and a second hand 113 in the example in FIG. 1) configured to be driven to rotate by the stepping motor 109 and indicate the time-of-day.

The analogue electronic timepiece also includes a rotation detection determination circuit 114 configured to detect the condition of the rotation of the stepping motor 109. The rotation detection determination circuit 114 detects an induced signal VRs generated by free vibration of the stepping motor 109 occurring when being driven to rotate and outputs a pattern of the induced signal VRs indicating the condition of the rotation of the stepping motor 109 (the driving state whether or not the stepping motor 109 is rotated) as described later to the control circuit 103. The control circuit 103 determines the condition of the rotation of the stepping motor 109 on the basis of the above-described pattern from the rotation detection determination circuit 114 and performs a pulse control such as a change of the drive pulse or the like.

The analogue electronic timepiece includes a timepiece case 115, the analogue display unit 110 is disposed on an outer surface of the timepiece case 115, and a movement 116 is disposed inside the timepiece case 115.

The oscillating circuit 101, the divider circuit 102, the control circuit 103, the cell 104, the power-supply voltage detection circuit 105, the drive pulse group selection circuit 106, the main drive pulse output circuit 107, the correction drive pulse output circuit 108, the stepping motor 109, and the rotation detection determination circuit 114 are components of the movement 116.

In general, a mechanical body of a timepiece including apparatuses such as a motive power source and a time reference of a timepiece is referred to as a movement. An electronic body of a timepiece may be referred to as a module. In a complete state as a timepiece, a dial and hands are mounted on the movement, which is housed in a timepiece case.

The oscillating circuit 101 and the divider circuit 102 constitute a signal generation unit, and the analogue display unit 110 constitutes a display unit. The power-supply voltage detection circuit 105 constitutes a voltage detecting unit, and the rotation detection determination circuit 114 constitutes a rotation detecting unit. The control circuit 103 constitutes a voltage detecting unit, and the control circuit 103 and the drive pulse group selection circuit 106 constitute a control unit. The main drive pulse output circuit 107 and the correction drive pulse output circuit 108 constitute a drive unit. The oscillating circuit 101, the divider circuit 102, the control circuit 103, the power-supply voltage detection circuit 105, the drive pulse group selection circuit 106, the main drive pulse output circuit 107, the correction drive pulse output circuit 108, and the rotation detection determination circuit 114 constitute the stepping motor control circuit.

Figure 2:
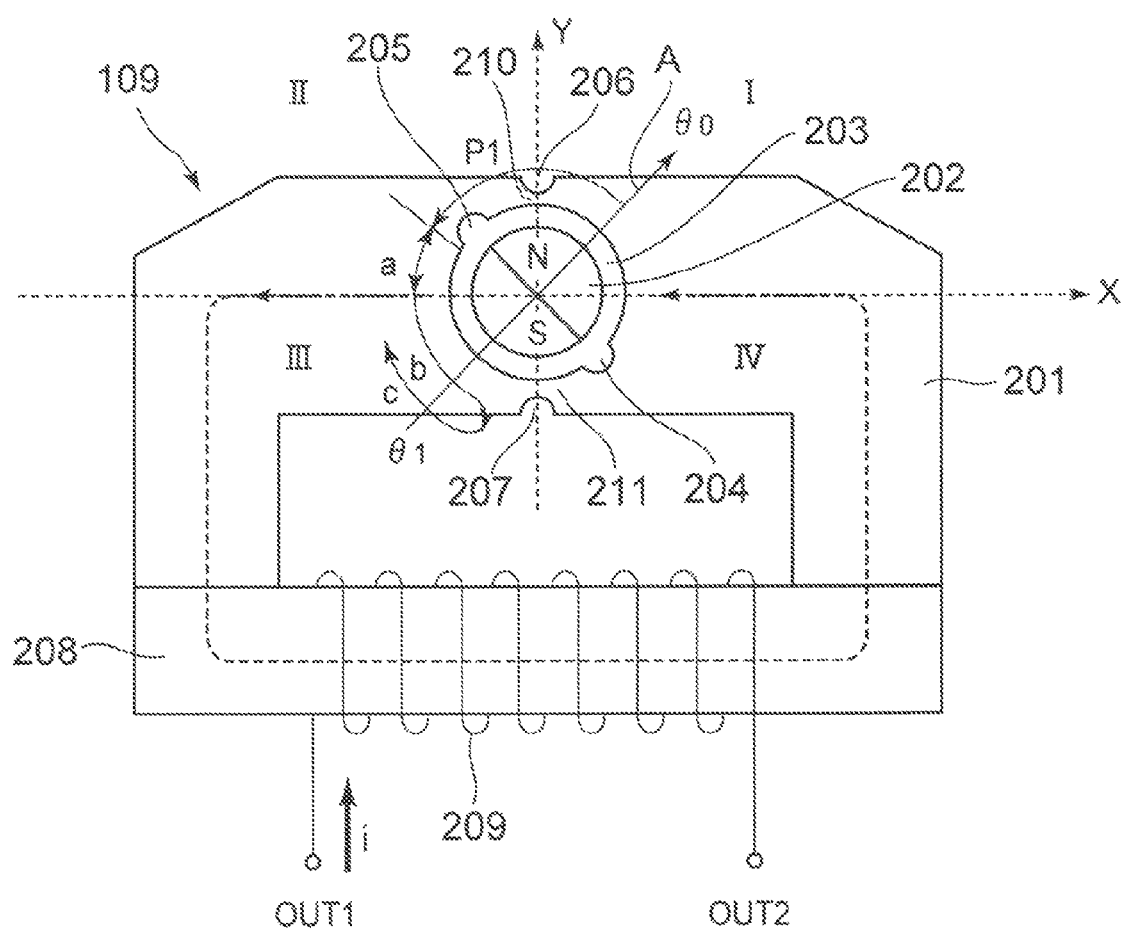
FIG. 2 is a configuration drawing of the stepping motor common to the respective embodiments of the invention.

FIG. 2 is a configuration drawing of the stepping motor 109 which is used in the respective embodiments of the invention, and illustrates an example of a stepping motor for a timepiece which is generally used in the analogue electronic timepiece.

In FIG. 2, the stepping motor 109 includes a stator 201 having a rotor housing through hole 203, a rotor 202 disposed in the rotor housing through hole 203 so as to be capable of rotating therein, a magnetic core 208 joined to the stator 201, and a coil 209 wound around the magnetic core 208. When the stepping motor 109 is used in the analogue electronic timepiece, the stator 201 and the magnetic core 208 are fixed to a base panel (not illustrated) with screws (not illustrated) or thermal caulking and are joined to each other. The coil 209 has a first terminal OUT1 and a second terminal OUT2.

The rotor 202 is magnetized in two polarities (S-pole and N-pole). A plurality of (two in this embodiment) notched portions (outer notches) 206 and 207 are provided on outer end portions of the stator 201 formed of a magnetic material at positions opposing to each other with the intermediary of the rotor housing through hole 203. Saturable portions 210 and 211 are provided between the respective outer notches 206 and 207, and the rotor housing through hole 203.

The saturable portions 210 and 211 are configured not to be magnetically saturated by a magnetic flux of the rotor 202 and to be magnetically saturated when the coil 209 is excited so that the magnetic resistance is increased. The rotor housing through hole 203 is formed into a circular hole shape having a plurality of (two in this embodiment) semicircular notched portions (inner notches) 204 and 205 integrally formed at opposed portions of the through hole having a circular contour.

The notched portions 204 and 205 constitute positioning portions for positioning the stop position of the rotor 202. In a state in which the coil 209 is not excited, the rotor 202 is stably stopped at a position corresponding to the above-described positioning portions, in other words, at a position (at a position of an angle $\theta 0$) where the direction of an axis of magnetic pole A of the rotor 202 extends orthogonally to a term connecting the notched portions 204 and 205 as shown in FIG. 2. An XY coordinate space extending about an axis of rotation (center of rotation) of the rotor 202 as a center is divided into four quadrants (first to fourth quadrants I to IV).

When the main drive pulse output circuit 107 supplies a square-wave main drive pulse P1 between the terminals OUT1 and OUT2 of the coil 209 (for example, the first terminal OUT1 side is a positive pole and the second terminal OUT2 side is a negative pole), and allows a current i to flow in the direction indicated by an arrow in FIG. 2, a magnetic flux in the direction of an arrow of a broken line is generated in the stator 201.

Accordingly, the saturable portions 210 and 211 are saturated and the magnetic resistance is increased, and then the rotor 202 rotates by 180° counterclockwise by a mutual operation between a magnetic pole generated in the stator 201 and a magnetic pole of the rotor 202, and the axis of magnetic pole A stops stably at a position of an angle $\theta 1$.

The direction of rotation (counterclockwise direction in FIG. 2) for causing the stepping motor 109 to drive to rotate and putting the same into a normal operation (the movement of the hands of the timepiece because the timepiece in this embodiment is an analogue electronic timepiece) is defined to be a normal direction and the reverse direction (clockwise direction) is defined to be a reverse direction.

Subsequently, when the main drive pulse output circuit 107 supplies square-wave main drive pulses having opposite polarities to the terminals OUT1 and OUT2 of the coil 209 (the first terminal OUT1 side is the negative pole and the second terminal OUT2 side is the positive pole, so that the polarity is inverted from the driving described above), and feeds a current in the opposite direction from that indicated by an arrow in FIG. 2, a magnetic flux in the opposite direction from that indicated by an arrow of a broken line is generated in the stator 201.

Accordingly, the saturable portions 210 and 211 are saturated first, and then the rotor 202 rotates in the same direction (normal direction) as that described above by 180° by the mutual operation between the magnetic pole generated in the stator 201 and the magnetic pole of the rotor 202, and the axis of magnetic pole A stops stably at the position of an angle $\theta 0$.

From then onward, by supplying the signals having different polarities (alternating signals) to the coil 209 in this manner, the above-described operation is repeatedly performed, so that the rotor 202 is rotated consecutively in the direction indicated by an arrow by 180° each.

FIG. 3 is a timing chart illustrating a case where the stepping motor 109 is driven by the main drive pulse P1 in the respective embodiments of the invention, also illustrating relationships (states) of energy of the drive pulse with respect to load, the rotation behaviors of the rotor 202, the patterns indicating the conditions of rotation, and the operations after the detection of rotation.

In FIG. 3, reference sign P1 designates the main drive pulse P1 and also an area in which the rotor 202 is driven to rotate with the main drive pulse P1. Reference signs a to e designate areas indicating the rotational positions of the rotor 202 due to free vibrations in association with the driving by the main drive pulse P1.

A predetermined time immediately after the driving by the main drive pulse P1 is designated as a first term T1, a predetermined time after the first term T1 is designated as a second term T2, and a predetermined time after the second term T2 is designated as a third term T3. In this manner, the entire detection term T starting from a timing immediately after the drive with the main drive pulse P1 is divided into a plurality of terms (in this embodiment, three terms T1 to T3).

When the XY-coordinate space where the main magnetic pole A of the rotor 202 is positioned by its rotation is divided into the first to fourth quadrants I to IV about the rotor 202, the first to third terms T1 to T3 may be expressed as follows.

In other words, in the state of the normal driving, the first term T1 corresponds to a term in which the condition of the first normal rotation of the rotor 202 is determined in the third quadrant III of the space about the rotor 202, the second term T2 corresponds to a term in which the condition of the first normal rotation and the condition of the first reverse rotation of the rotor 202 are determined in the third quadrant III, and the third term T3 corresponds to a term in which the condition of the rotation after the first reverse rotation of the rotor 202 is determined in the third quadrant III.

Here, the term "normal driving" means a state in which the cell 104 is in a predetermined range with reference to a nominal voltage and a state in which the load driven under the normal condition is driven normally by the main drive pulse P1. In this embodiment, the time-of-day hands (the hour hand 111, the minute hand 112, and the second hand 113) are defined as a load driven under the normal condition, and the state in which the above-described load is driven normally by the main drive pulse P1 is defined as the normal driving.

In a state in which the drive energy is slightly smaller than the normal driving (the state of slightly small energy), the first term T1 corresponds to a term in which the condition of the first normal rotation of the rotor 202 in the second quadrant II is determined, the second term T2 corresponds to a term in which the condition of the first normal rotation of the rotor 202 in the second quadrant II, the condition of the first normal rotation of the rotor 202 in the third quadrant III, and the condition of the first reverse rotation of the rotor 202 in the third quadrant III are determined, and the third term T3 is a term in which the condition of the rotation of the rotor 202 after the first reverse rotation in the third quadrant III is determined.

In a state in which the drive energy is further smaller than the state in which the energy is slightly small (the state in which the energy is significantly small), the first term T1 corresponds to a term in which the condition of the first normal rotation of the rotor 202 in the second quadrant II is determined, the second term T2 corresponds to a term in which the condition of the first normal rotation of the rotor 202 in the second quadrant II, the condition of the first normal rotation of the rotor 202 in the third quadrant III, and the condition of the first reverse rotation of the rotor 202 in the third quadrant III are determined, and the third term T3 corresponds to a term in which the condition of the first reverse rotation of the rotor 202 in the third quadrant III and a term in which the condition of the rotation after the first reverse rotation of the rotor 202 in the third quadrant III are determined.

In a state of the rotation with larger driving energy than the normal driving (the state of driving with an allowance), the first term T1 corresponds to a term in which the condition of the first normal rotation of the rotor 202 in the third quadrant III is determined, the second term T2 is a term in which the condition of the first reverse rotation of the rotor 202 in the third quadrant III and the condition of the rotation after the first reverse rotation of the rotor 202 in the third quadrant III are determined, and the third term T3 is a term in which the condition of the rotation after the first reverse rotation of the rotor 202 in the third quadrant III is determined.

The state of non-rotation is a driving state in which the drive energy is significantly lowered with respect to the normal driving, and the energy of the main drive pulse P1 runs short, so that the stepping motor 109 cannot be rotated.

Reference sign Vcomp represents a reference threshold voltage for determining the voltage level of the induced signal VRs generated in the stepping motor 109. The reference threshold voltage Vcomp is set in such a manner that the induced signal VRs exceeds the reference threshold voltage Vcomp when the rotor 202 performs a certain fast operation as in the case where the stepping motor 109 rotates, and the induced signal VRs does not exceed the reference threshold voltage Vcomp when the rotor 202 does not perform the certain fast operation as in the case where the stepping motor 109 does not rotate.

For example, in the state of the normal driving in FIG. 3, the induced signal VRs generated in an area b is detected in the first term T1 and the second term T2, the induced signal VRs generated in an area c is detected in the second term, T2, and the induced signal VRs generated after the area c is detected in the third term T3.

A case where the rotation detection determination circuit 114 detects the induced signal VRs exceeding the reference threshold voltage Vcomp is expressed as a determination value "1", and a case where the rotation detection circuit 110 cannot detect the induced signal VRs exceeding the reference threshold voltage Vcomp is expressed as a determination value "0". In the example of the normal driving in FIG. 3, a pattern (0, 1, 1) is obtained as a pattern indicating the condition of the rotation (the determination value in the first term T1, the determination value in the second term T2, and the determination value in the third term T3).

In this case, the control circuit 103 determines the state as the normal driving state on the basis of the above-described pattern, and drives the stepping motor 109 by the main drive pulse P1 for the next time of driving. When the state of the normal driving continues for a predetermined number of times, the control circuit 103 determines the state as a state having a driving allowance, changes the pulse to a main drive pulse P1 having energy one rank lower (rank down), and drives the stepping motor 109 by the changed main drive pulse P1 from the next time onward.

Since a pattern (1, 1, 0) is obtained in a state of slightly small energy, the control circuit 103 determines the state as a state having a slightly small energy when the above-described pattern is obtained, and resets the counted value (pulse count) of the counter configured to count the number of times of consecutive driving by the main drive pulse P1 in question.

The above-described counter is a function of the control circuit 103, although not illustrated.

In the same manner, since a pattern (0, 1, 0) is obtained in the state of having a driving allowance, the control circuit 103 drives using the main drive pulse P1 for the next driving in the same manner as the case of the normal driving and, when the state of the normal driving continues for a predetermined number of times, the control circuit 103 determines the state as a state having a driving allowance, changes the pulse to a main drive pulse P1 having energy one rank lower and drives the stepping motor 109 by the changed main drive pulse P1 from the next time onward.

Also, a pattern (1, 0, 1) is obtained in the state of significantly small energy, the control circuit 103 determines that the stepping motor 109 can be rotated but the drive energy is not sufficient based on the above-described pattern, changes the pulse to a main drive pulse P1 one rank higher (rank up) and drives the stepping motor 109 by the changed main drive pulse P1 from the next time of driving onward without driving the stepping motor 109 by the correction drive pulse P2.

Since a pattern (0, 0, 0) is obtained in the non-rotation state, the control circuit 103 determines that the stepping motor 109 cannot be rotated in the case of the above-described pattern, forcedly rotates the stepping motor 109 by the correction drive pulse P2, and ranks up the main drive pulse P1 to a main drive pulse P1 having energy one rank higher.

FIG. 4 is a flowchart showing the operation of the stepping motor control circuit, the movement, and the analogue electronic timepiece according to the first embodiment of the invention, and is a flowchart mainly showing the process in the control circuit 103.

In FIG. 4, reference sign NV designates a counted value of the number of times that the power-supply voltage detection circuit 105 detects the voltage of the cell 104 (the number of times of detection of the cell voltage), reference sign n designates the rank of the main drive pulse P1, and reference sign N designates a counted value of the number of times of the consecutive driving by the same main drive pulse P1 (number of times of consecutive driving).

In this embodiment, two types of the drive pulse groups including a first drive pulse group G1, and a second drive pulse group G2 as a plurality of types of drive pulse groups G are employed.

The first drive pulse group G1 includes three ranks (a first rank to a third rank) of main drive pulses P11, P12, and P13 (the magnitude relationship of energy is P11<P12<P13) having energies different from each other, and the second drive pulse group G2 includes three ranks (the third rank to the fifth rank) of the main drive pulses P13, P14, and P15 (the magnitude relationship of energy is P13<P14<P15) having energies different from each other.

The main drive pulse P1 having the highest energy rank included in the first drive pulse group G1 is the main drive pulse P13 of the third rank, and the main drive pulse P1 having the highest energy rank included in the second drive pulse group G2 is the main drive pulse P15 of the fifth rank. The correction drive pulse P2 has energy larger than the respective main drive pulses P11 to P15. The respective drive pulses are configured to have different pulse widths so as to differentiate the energy.

Referring now to FIG. 1 to FIG. 4, the operation in the first embodiment of the invention will be described.

In FIG. 1, the oscillating circuit 101 generates a reference clock signal of a predetermined frequency, and the divider circuit 102 divides the frequency of the above-described signal generated by the oscillating circuit 101 and generates a clock signal as a reference of time counting, and outputs the same to the control circuit 103. The control circuit 103 performs a time counting operation by counting the clock signal.

First of all, the control circuit 103 outputs the voltage detection control signal to the power-supply voltage detection circuit 105 and gives an instruction to detect the voltage of the cell 104 (S401 in FIG. 4), and then changes the counted value NV of the number of times of cell voltage detection to "1" (Step S402).

The power-supply voltage detection circuit 105 detects the voltage of the cell 104 in response to the above-described voltage detection control signal, and outputs the cell voltage in question to the control circuit 103.

Subsequently, the control circuit 103 determines whether or not the cell voltage detected by the power-supply voltage detection circuit 105 exceeds the predetermined reference voltage Vref (Step S403). Here, the reference voltage Vref is the same as the reference forward voltage Vref shown in FIG. 5. However, a different voltage may also be used.

When the control circuit 103 determines that the cell voltage exceeds the reference voltage Vref in the process step S403, the control circuit 103 selects the drive pulse group G1 (Step S404), and selects the highest rank (n=3, that is, the main drive pulse P13) from among a plurality of the main drive pulses P11 to P13 included in the drive pulse group G1 in question (Step S405).

Subsequently, the control circuit 103 sets the counted value NV of the number of times of cell voltage detection so as to count until the predetermined number of times (referred to as "first number of times of cell voltage detection", 80 times in the first embodiment) is reached (Step S406).

Subsequently, the control circuit 103 sets the counted value N of the number of times of consecutive driving so as to count until the predetermined number of times (referred to as "first number of times of consecutive driving", 3600 times in the first embodiment) is reached (Step S407), and the procedure goes to the process step S412.

When the control circuit 103 determines that the cell voltage does not exceed the predetermined reference voltage Vref in the process step S403, the control circuit 103 selects the drive pulse group G2 (Step S408), and selects the highest rank (n=5, that is, the main drive pulse P15) from among a plurality of the main drive pulses P13 to P15 included in the drive pulse group G2 in question (Step S409).

Subsequently, the control circuit 203 sets the counted value NV of the number of times of cell voltage detection so as to count until the predetermined number of times (referred to as "second number of times of cell voltage detection") is reached (Step S410). The second number of times of cell voltage detection is larger than the first number of times of cell voltage detection, and is 3600 times in the first embodiment.

Subsequently, the control circuit 103 sets the counted value N of the number of times of consecutive driving so as to count until the predetermined number of times (second number of times of consecutive driving) is reached (Step S411), and the procedure goes to the process step S412. The second number of times of consecutive driving is smaller than the first number of times of consecutive driving, and is 80 times in the first embodiment.

As described above, in the process steps S404, S405, S408, and S409, a main drive pulse having the highest energy rank from among the plurality of main drive pulses included in the selected drive pulse group is initially selected for driving. Therefore, since a main drive pulse having the lowest energy rank from among the plurality of main drive pulses included in the selected drive pulse group is not initially selected for driving, the stepping motor 109 may be rotated further reliably in a case where the cell voltage is lowered when the drive pulse group is selected.

As in the process steps S406 and S410, when the cell voltage is high, the counted value NV of the number of times of cell voltage detection is set to be smaller than in the case where the cell voltage is low. When the cell voltage is high, the voltage variation is significant and hence the operation may become unstable. Therefore, by reducing the interval of detection of the cell voltage than in the case where the cell voltage is low, the adequate drive pulse group may be set.

As in the process steps S407 and S411, when the cell voltage is high, the counted value N of the number of times of consecutive driving is set to be larger than in the case where the cell voltage is low. When the cell voltage is high, the voltage variation is significant and hence the operation may become unstable. Therefore, by increasing the counted value N of the number of times of consecutive driving than in the case where the cell voltage is low, likelihood of occurrence of the rank variation of the main drive pulse P1 is reduced, so that the operation may be stabilized.

Subsequently, the control circuit 103 resets the counted value N of the number of times of consecutive driving to zero in the process step S412, and then outputs a control signal indicating a selected drive pulse group G and the main drive pulse P1 to the drive pulse group selection circuit 106 as described above (Step S413). The above-described control signal includes a drive pulse group control signal which indicates the selected drive pulse group G and a main drive pulse control signal which indicates the selected main drive pulse P1.

The drive pulse group selection circuit 106 selects a drive pulse group G corresponding to the control signal from the control circuit 103 and outputs the main drive pulse P1 of the above-described drive pulse group to the main drive pulse output circuit 107. The main drive pulse output circuit 107 drives the stepping motor 109 to rotate by the above-described main drive pulse P1.

When the stepping motor 109 is rotated, the time-of-day hands 111 to 113 of the analogue display unit 110 are driven to move and the current time-of-day display is performed.

The rotation detection determination circuit 114 detects the induced signal VRs generated by the rotational driving of the stepping motor 109 in the detecting term T every time when the driving by the main drive pulse P1 is performed, and determines to which terms T1 to T3 the induced signal VRs exceeding the reference threshold voltage Vcomp belongs.

When the control circuit 103 determines that the induced signal VRs exceeding the reference threshold voltage Vcomp is not detected within the first term T1 (it is a case where the pattern is (0, x, x), where the determination value "x" means whether the determined value is "1" or "0" is no object.) (Step S414), whether or not the induced signal VRs exceeding the reference threshold voltage Vcomp is detected within the second term T2 is determined (Step S422).

When the control circuit 103 determines that the induced signal VRs exceeding the reference threshold voltage Vcomp is not detected within the second term T2 in the process step S422 (it is a case where the pattern is (0, 0, x)), whether or not the induced signal VRs exceeding the reference threshold voltage Vcomp is detected within the third term T3 is determined (Step S418).

When the control circuit 103 determines that the induced signal VRs exceeding the reference threshold voltage Vcomp is not detected within the third term T3 in the process step S418 (it is a case where the pattern is (x, 0, 0)), the stepping motor 109 is determined not to be rotated. In this case, the control circuit 103 outputs a correction drive pulse control signal to the drive pulse group selection circuit 106 so as to drive the stepping motor 109 by the correction drive pulse P2 having the same polarity as the main drive pulse P1 in the process step S413 (Step S420). The drive pulse group selection circuit 106 outputs the correction drive pulse to the correction drive pulse output circuit 108 in response to the above-described correction drive pulse control signal. The correction drive pulse output circuit 108 drives the stepping motor 109 by the correction drive pulse P2 and forcedly rotates the stepping motor 109.

Subsequently, the control circuit 103 changes the rank n of the main drive pulse P1 to have energy one rank higher, and resets the counted value N of the number of times of consecutive driving to zero (Step S421).

Subsequently, the control circuit 103 determines whether or not the counted value NV of the number of times of cell voltage detection reaches the predetermined number of times (Step S417). When the control circuit 103 determines that the predetermined number of times is reached in the process step S417, the procedure goes back to the process step S401, and when the control circuit 103 determines that the predetermined number of times is not reached, the counted value NV of the number of times of cell voltage detection is incremented by one and the procedure goes back to the process step S413 (Step S426).

When the control circuit 103 determines that the induced signal VRs exceeding the reference threshold voltage Vcomp is detected within the third term T3 in the process step S418 (it is a case where the pattern is (x, 0, 1)), the stepping motor is rotated but the energy is significantly small, and hence the control circuit 103 changes the rank n of the main drive pulse P1 to have energy one rank higher, and resets the counted value N of the number of times of consecutive driving to zero (Step S419), and the procedure goes to the process step S417.

When the control circuit 103 determines that the induced signal VRs exceeding the reference threshold voltage Vcomp is detected within the second term T2 in the process step S422 (it is a case where the pattern is (0, 1, x)), the counted value N of the number of times of consecutive driving is incremented by "1" (Step S423).

Subsequently, the control circuit 103 determines whether or not the counted value N reaches the predetermined number of times (that is, whether or not the driving which makes the pattern to (0, 1, x) is performed by the main drive pulse P1 having the same energy consecutively by the predetermined number of times) (Step S424), and if the predetermined number of times is reached, the rank n of the main drive pulse P1 is lowered by one rank and resets the counted value N to "0", and the procedure goes to the process step S417 (Step S425), and if the counted value N does not reach the predetermined value, the procedure goes immediately to the process step S417.

In contrast, when the control circuit 103 determines that the induced signal VRs exceeding the reference threshold voltage Vcomp is detected within the first term T1 in the process step S414, the procedure goes to the process step S418 when the induced signal VRs exceeding the reference threshold voltage Vcomp is not detected within the second term T2 (Step S415).

When the control circuit 103 determines that the induced signal VRs exceeding the reference threshold voltage Vcomp is detected within the second term T2 in the process step S415 (it is a case where the pattern is (1, 1, x)), the counted value N of the number of times of consecutive driving is reset to "0" and the procedure goes to the process step S417 (Step S416).

From then onward, the rank down is performed every time when the number of times of the consecutive driving reaches the predetermined number of times using the main drive pulse P1 included in the selected drive pulse group, and if the energy runs short, a main drive pulse P1 having adequate energy is selected while performing rank up to drive the stepping motor 109 to rotate. Also, the control circuit 103 detects the cell voltage every time when the number of times of cell voltage detection reaches the predetermined number of times and selects an adequate drive pulse group for driving.

As described above, the stepping motor control circuit according to the first embodiment of the invention at least includes: the cell 104 as a power supply configured to supply power to the stepping motor 109, the voltage detecting unit configured to detect the voltage of the cell 104, the rotation detection determination circuit 114 configured to detect the condition of the rotation of the stepping motor, the control unit configured to select a drive pulse group G corresponding to the voltage of the cell 104 detected by the above-described voltage detecting unit from among the plurality of drive pulse groups G each including the plurality of types of main drive pulses P1, and select a drive pulse according to the condition of the rotation of the stepping motor 109 detected by the rotation detection determination circuit 114 from among the plurality of types of main drive pulses P1 included in the above-described selected drive pulse group G or the correction drive pulse P2 having larger energy than the respective main drive pulses P1 described above, and the drive unit configured to drive the stepping motor 109 to rotate by the drive pulse selected by the above-described control unit, and when the above-described control unit selects a main drive pulse P1 initially by selecting the above-described drive pulse group G, the above-described control unit selects a main drive pulse P1 other than the main drive pulse P1 having the smallest energy from among the main drive pulses P1 included in the selected drive pulse group G (in the first embodiment, the main drive pulse P1 having the largest energy in the main drive pulses P1 included in the drive pulse group G in question).

Therefore, the stepping motor 109 can be rotated further reliably even when the variations such that the voltage to be applied from the cell 104 to the stepping motor 109 is lowered due to the cell properties or the like.

Also, since the driving is performed firstly by the main drive pulse P1 having the highest energy rank from among the plurality of main drive pulses P1 included in the drive pulse group in question when selecting the drive pulse group, the rotational driving of the stepping motor may be performed further reliably.

For example, even when the voltage detected by the power-supply voltage detection circuit 105 shows a certain value or higher, the voltage to be applied to the stepping motor 109 may be significantly lowered due to the internal resistance of the cell 104 at the time of actual rotational driving. In such a case, even though a drive pulse group according to the cell voltage is selected, when the stepping motor 109 is configured to be driven firstly from the main drive pulse having the lowest energy rank, the stepping motor 109 may not be rotated due to the short of energy. However, as the stepping motor 109 in the embodiment of the invention is configured to be driven firstly by selecting a main drive pulse P1 having energy rank other than the lowest energy rank from among the main drive pulses P1 included in the selected drive pulse group (the main drive pulse P1 having the highest energy rank in a second embodiment), non-rotation of the stepping motor 109 due to the short of energy may be avoided further reliably.

Here, the above-described voltage detecting unit may be configured to detect the voltage of the cell 104 at intervals according to the voltage of the cell 104.

The above-described voltage detecting unit may be configured so as to detect the voltage of the above-described cell at shorter intervals when the voltage of the above-described cell is high than when the voltage of the cell is low.

In this manner, in an area where the voltage is unstable as in the high-voltage area of the cell 104, a change of the cell voltage may be figured accurately by shortening the detection intervals of the cell voltage, so that the adequate drive pulse according to the cell voltage may be selected for driving. In contrast, in an area where the cell voltage is stable, the detection operation of the cell voltage may be reduced by elongating the detection intervals of the cell voltage.

The above-described control unit is configured to lower the rank of the main drive pulse P1 when the driving with an allowance is performed consecutively by a predetermined number of times by the main drive pulse P1 having the same energy, and the above-described predetermined number of times may be set to the number of times according to the voltage of the cell 104 detected by the above-described voltage detecting unit.

The above-described predetermined number of times may be set to the number of times larger when the voltage of the cell 104 is high than when the voltage is low.

Even when performing control to lower the rank, since the cycle of lowering the rank is set to a cycle according to the voltage, the lowering of the rank according to the cell voltage is achieved. Therefore, an adequate drive pulse may be selected for driving, so that the stable rotational driving is enabled.

As described above, a stable driving flexibly adapted to the change in driving energy in the high-voltage area is enabled by changing the number of times of consecutive driving or the number of times of cell voltage detection according to the cell voltage.

Since the movement according to the first embodiment of the invention is provided with any one of the above-described stepping motor control circuits, advantages such that an analogue electronic timepiece capable of rotating the stepping motor 109 further reliably even when the voltage applied to the stepping motor 109 is varied is constructed are achieved.

In addition, since the analogue electronic timepiece according to the first embodiment of the invention includes the above-described movement, advantages such that the stepping motor 109 may be rotated further reliably even when the cell voltage variations such as lowering of the voltage of the cell 104 are generated, and further reliable movement of hands of the timepiece is ensured are achieved.

Although the example in which two drive pulse groups are used has been described in the first embodiment, a configuration using three or more plurality of drive pulse groups is also applicable.

Figure 6:
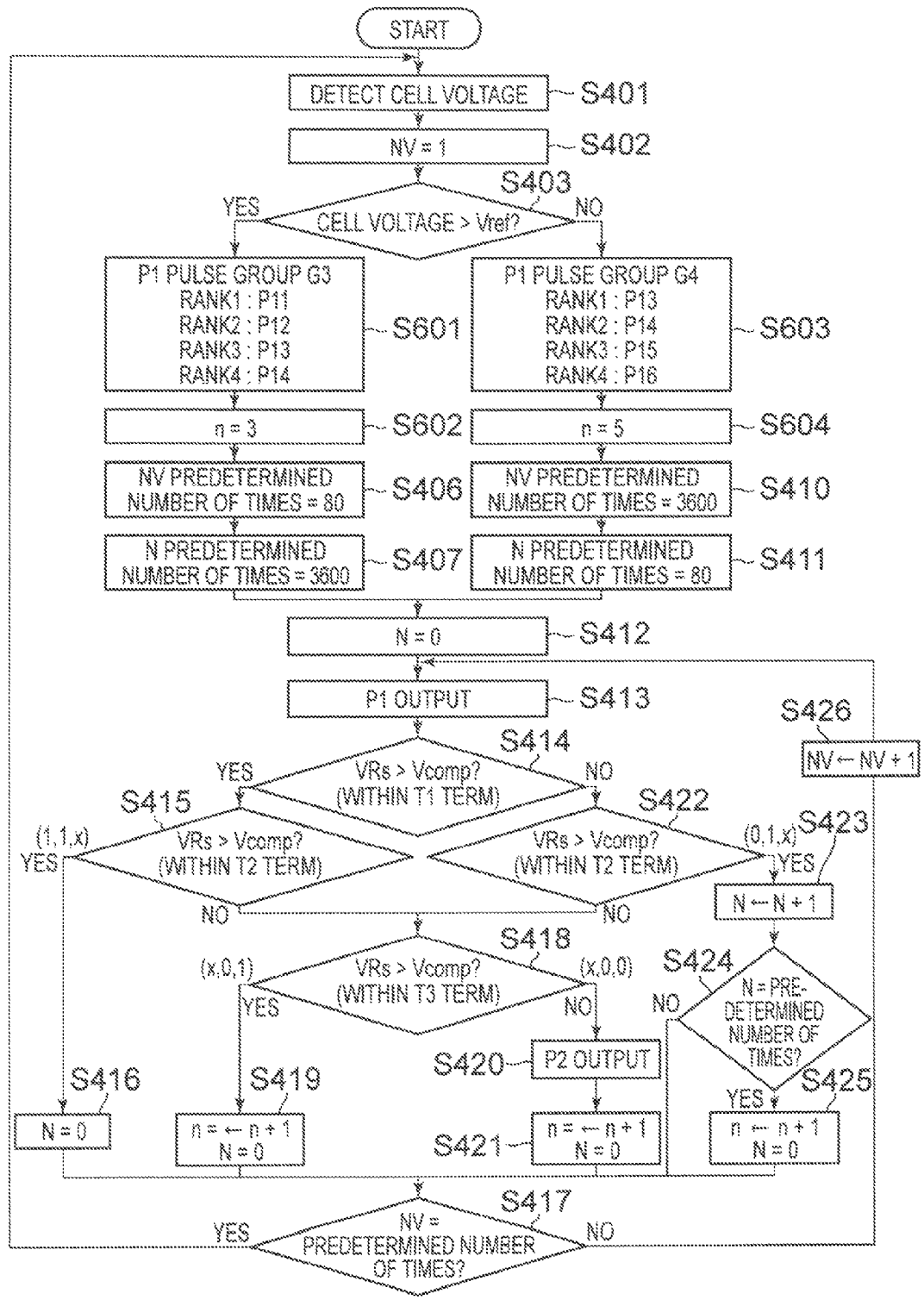
FIG. 6 is a flowchart of the stepping motor control circuit, the movement, and the analogue electronic timepiece according to a second embodiment of the invention.

FIG. 6 is a flowchart showing the operation of the stepping motor control circuit, the movement, and the analogue electronic timepiece according to the second embodiment of the invention, and portions performing the same process as in FIG. 4 are designated by the same reference numerals. The block diagrams, the timing chart and the like of the second embodiment are the same as those in FIG. 1 to FIG. 3 and FIG. 5.

In the first embodiment, when the control unit selects a main drive pulse P1 initially by selecting a drive pulse group, a main drive pulse P1 having the largest energy in the main drive pulses P1 included in the selected drive pulse group is selected as a main drive pulse P1 other than the main drive pulse P1 having the smallest energy included in the drive pulse group in question. However, in the second embodiment, a main drive pulse P1 having the second largest energy is selected when the three or more types of main drive pulses P1 are included in the selected drive pulse group in question as the main drive pulse P1 other than the above-described main drive pulse P1 having the smallest energy. Accordingly, even when the voltage of the cell 104 is lowered, the stepping motor 109 may be rotated further reliably, and when the rotation is not achieved by the selected main drive pulse P1, the stepping motor 109 may be driven by a main drive pulse P1 having larger energy than the main drive pulse P1 in question without driving the stepping motor 109 immediately by the correction drive pulse P2, whereby the power saving is enabled.

Hereinafter, the second embodiment of the invention will be described only about the operation of portions different from the first embodiment.

In FIG. 6, the control circuit 103 counts the clock signal from the divider circuit 102 and performs the time counting operation, and when the control circuit 103 determines that the voltage of the cell 104 exceeds the reference voltage Vref (Step S403), a drive pulse group G3 is selected (Step S601).

Since the drive pulse group G3 includes three or more types of the main drive pulses P11 to P14 having energies different from each other, the control circuit 103 selects a main drive pulse (n=3, that is, the main drive pulse P13) having the second highest energy rank from among the plurality of main drive pulses P11 to P14 included in the selected drive pulse group G3 (Step S602).

From then onward, by performing the same process as shown in FIG. 4, the stepping motor 109 is driven to rotate (Steps S406, S407, and S412 to S426).

When the rotation is not achieved by the main drive pulse P13 selected initially, an attempt is made to drive by the main drive pulse P14 having energy one rank higher without driving immediately by the correction drive pulse P2. Accordingly, power saving is achieved.

In contrast, when the control circuit 103 determines that the cell voltage does not exceed the predetermined reference voltage Vref in the process step S403, the control circuit 103 selects a drive pulse group G4 (Step S603).

Since the drive pulse group G4 includes three or more types of the main drive pulses P13 to P16 having energies different from each other, the control circuit 103 selects a main drive pulse (n=5, that is, the main drive pulse P15) having the second highest energy rank from among the plurality of main drive pulses P13 to P16 included in the selected drive pulse group G4 (Step S604).

From then onward, by performing the same process as shown in FIG. 4, the stepping motor 109 is driven to rotate (Steps S410, S411, and S412 to S426).

In this case, when the rotation is not achieved by the main drive pulse P15 selected initially, an attempt is made to drive by the main drive pulse P16 having energy one rank higher without driving immediately by the correction drive pulse P2. Accordingly, power saving is achieved.

As described thus far, the stepping motor control circuit according to the second embodiment of the invention is characterized in that when the control unit selects a main drive pulse P1 initially by selecting the drive pulse group G, the above-described control unit selects a main drive pulse P1 other than the main drive pulse P1 having the smallest energy from among the main drive pulses P1 included in the selected drive pulse group G (in the second embodiment, the main drive pulse P1 having the second largest energy in the main drive pulses P1 included in the drive pulse group G in question).

Therefore, the same advantages as in the first embodiment such that the stepping motor 109 can be rotated further reliably even when the variations such that the voltage to be applied from the cell 104 to the stepping motor 109 is lowered are achieved.

When the energy of the main drive pulse P1 having the largest energy in the selected drive pulse group G is too large, the rotating speed at the time of reverse rotation is lowered due to the generation of the pulse-off in the vicinity of the position of an angle θ0 or the position of an angle θ1 in FIG. 2, whereby the adequate induced signal VRs may not be generated and hence the erroneous detection of rotation may occur. However, by selecting the main drive pulse P1 having the second largest energy for driving, occurrence of such an erroneous detection of rotation may be inhibited.

Even in the case of non-rotation by the initially selected main drive pulse P1, the rotational driving can be achieved by a main drive pulse P1 larger than the main drive pulse P1 in question, and hence advantages such that the number of times of driving by the correction drive pulse P2 is inhibited, and reduction of power consumption is enabled are achieved.

Figure 7:
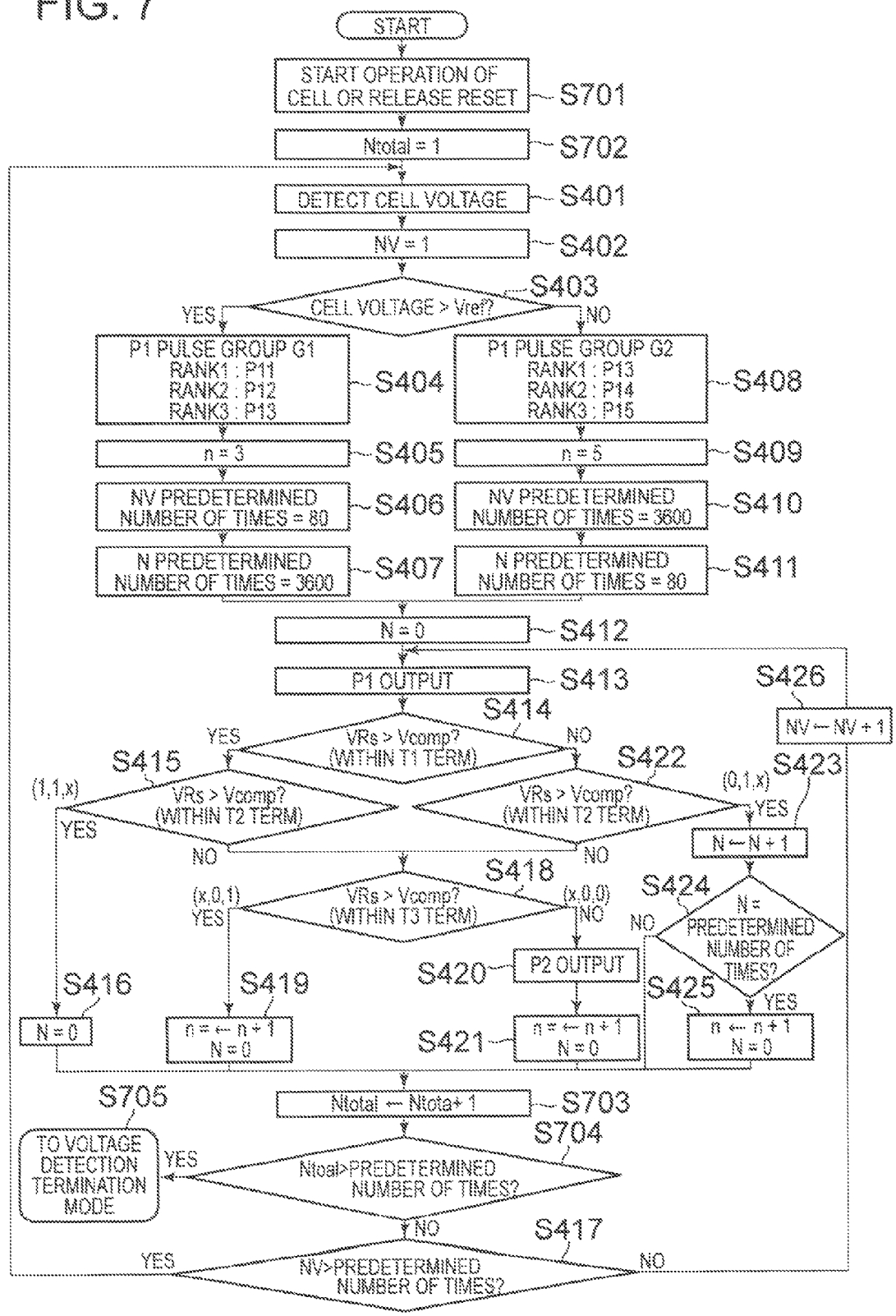
FIG. 7 is a flowchart of the stepping motor control circuit, the movement, and the analogue electronic timepiece according to a third embodiment of the invention.
Figure 8:
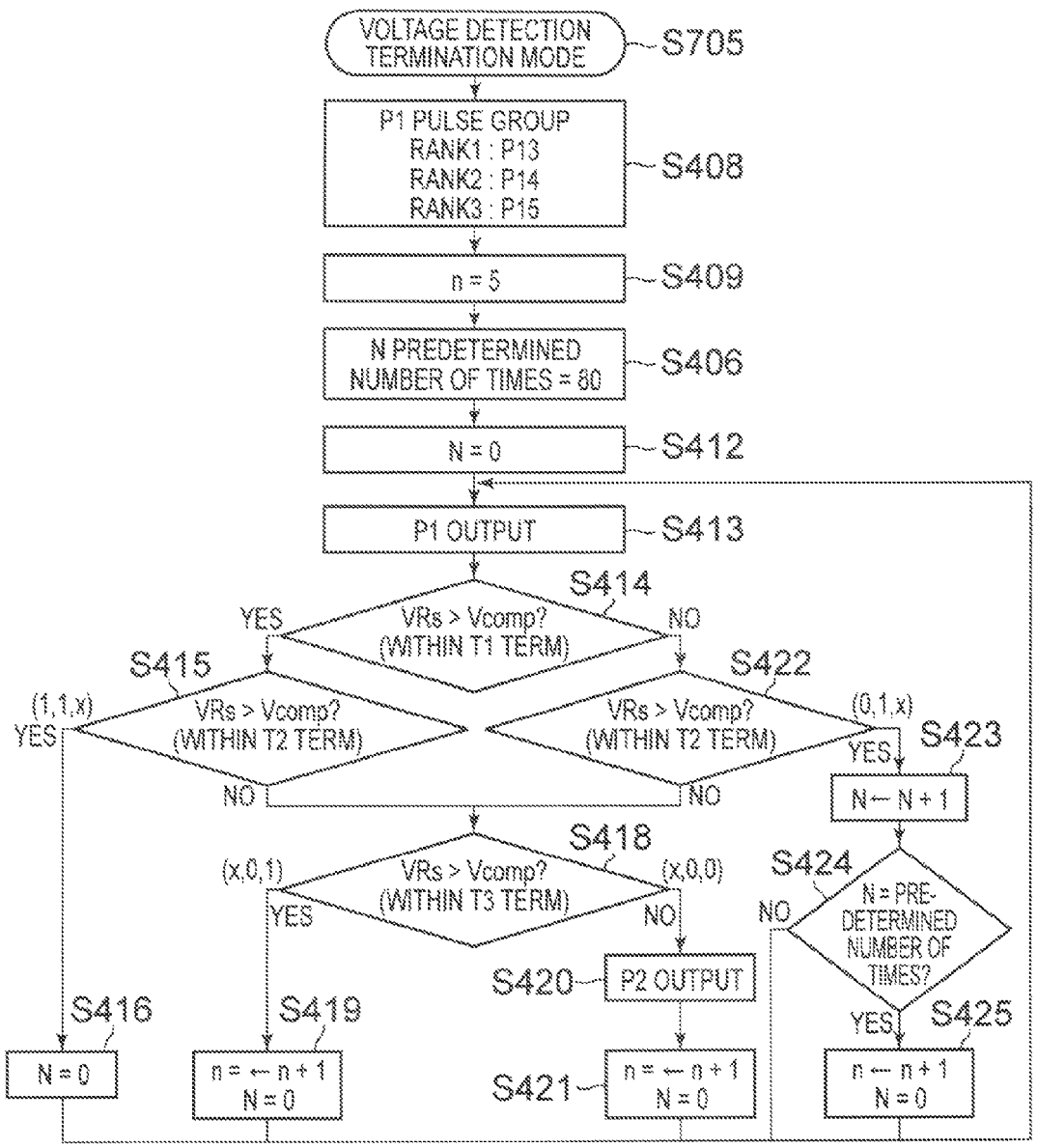
FIG. 8 is a flowchart of the stepping motor control circuit, the movement, and the analogue electronic timepiece according to a third embodiment of the invention.

FIGS. 7 and 8 are flowcharts showing the operation of the stepping motor control circuit, the movement, and the analogue electronic timepiece according to a third embodiment of the invention, and portions performing the same process as in FIG. 4 are designated by the same reference numerals. The block diagrams, the timing chart and the like of the third embodiment are the same as those in FIG. 1 to FIG. 3 and FIG. 5.

The first and second embodiments are configured to detect the voltage of the cell 104 every time when driven by the main drive pulse P1 by the predetermined number of times, select a drive pulse group G, and determine a main drive pulse P1. However, the third embodiment is configured to detect the voltage of the cell 104 during a predetermined period after the start of the cell operation or the release of the reset. Since the voltage variations are small in the second area in which the voltage of the cell 104 is stable and hence frequent detection of the voltage and setting of the drive pulse group G are not necessary, the power required for the voltage detection and the operation of counting the number of times of driving by the main drive pulse P1 may be reduced.

Hereinafter, the third embodiment of the invention will be described only about the operation of portions different from the first embodiment.

In FIG. 7, when the start of the cell operation (the setting of the cell 104 into the analogue electronic timepiece) or the release of reset (the release of the reset operation with respect to a reset terminal (not illustrated) of the control circuit 103) is performed, the control circuit 103 starts operation and determines that the cell operation is started or the reset is released (Step S701), and sets a counted value Ntotal of total number of times of operation to "1" (Step S702).

The control circuit 103 increments the counted value Ntotal of the total number of times of operation by "1" (Step S703) after the control circuit 103 has performed the voltage detection of the cell 104, the selection of the driving pulse group G or the main drive pulse P1, and the driving of the stepping motor 109 (Steps S401 to S425).

When the control circuit 103 determines that the counted value Ntotal does not exceed the predetermined number of times (that is, the predetermined period has not elapsed from the start of the cell operation or the release of the reset) (Step S704), the procedure goes to the process step S417.

In the process step S704, when the control circuit 103 determines that the counted value Ntotal exceeds the predetermined number of times (that is, the predetermined period has elapsed from the start of the cell operation or the release of the reset), the procedure goes to the operation of a voltage detection termination mode illustrated in FIG. 8 (Step S705). The voltage detection termination mode is a mode configured to drive the stepping motor 109 to rotate without detecting the voltage (that is, without performing the selection operation of the drive pulse group G).

In the voltage detection termination mode, the control circuit 103 selects the drive pulse group G2 for low voltages (Step S408) and selects the highest rank (n=5, that is, the main drive pulse P15) among the plurality of main drive pulses P13 to P15 included in the drive pulse group G2 in question (Step S409).

Subsequently, the control circuit 103 sets the counted value N of the number of times of consecutive driving to count to a predetermined number of times (80 times in the third embodiment) (Step S406), and then the procedure goes to the process step S412, where the control circuit 103 drives the stepping motor 109 to rotate in the same manner as described above by using the selected main drive pulse group G2 from then onward (Steps S413 to S416 and S418 to S425).

As described above, the stepping motor control circuit according to the third embodiment of the invention is configured not only to achieve the advantages as in the first embodiment, but also to cause the voltage detecting unit to detect the voltage of the cell 104 only during the predetermined period after the start of the cell operation or after the release of the reset. Therefore, advantages that the power saving is enabled by eliminating the unnecessary voltage detection are achieved.

FIG. 9 is a flowchart showing the operation of the stepping motor control circuit, the movement, and the analogue electronic timepiece according to a fourth embodiment of the invention, and portions performing the same process as in FIG. 4 are designated by the same reference numerals. The block diagrams, the timing chart and the like according to the fourth embodiment are the same as those in FIG. 1 to FIG. 3 and FIG. 5.

The first to the third embodiments are configured to select a drive pulse group G from among the plurality of drive pulse groups G according to the cell voltage, and select a main drive pulse P1 in the drive pulse group G in question. However, the fourth embodiment is configured to have at least one (one in the fourth embodiment) drive pulse group G having a plurality of types of main drive pulses P1 and a fixed drive pulse having predetermined energy, and select the drive pulse G according to the cell voltage or the fixed drive pulse for driving. In particular, in the fourth embodiment, the fixed drive pulse having predetermined energy is selected for driving when the cell voltage exceeds a predetermined voltage. With the stepping motor 109 driven by the fixed drive pulse in the area in which the cell voltage varies in this manner, the stable rotational driving is enabled.

Hereinafter, the fourth embodiment of the invention will be described only about the operation of portions different from the above-described first embodiment.

In FIG. 9, the control circuit 103 counts the clock signal from the divider circuit 102 and performs the time counting operation, and when the control circuit 103 determines that the voltage of the cell 104 exceeds the reference voltage Vref (Step S403), a drive pulse (fixed drive pulse) P15 having predetermined energy is selected (Step S903).

Subsequently, the control circuit 103 sets the counted value NV of the number of times of cell voltage detection to a predetermined number of times (80 times in the fourth embodiment) (Step S904), increments the counted value NV by "1" (Step S905), and then drives the stepping motor 109 by the fixed drive pulse P1 in question.

Subsequently, the control circuit 103 determines whether or not the counted value NV is the above-described predetermined number, and when the counted value NV does not reach the predetermined number of times, the procedure goes back to the process step S905, and when the counted value NV reaches the predetermined number of times, the procedure goes back to the process step S401 (Step S907).

In contrast, when the control circuit 103 determines that the voltage of the cell 104 does not exceed the predetermined reference voltage Vref in the process step S403, the control circuit 103 selects the drive pulse group G5 (Step S901).

Subsequently, the control circuit 103 selects the main drive pulse P14 of the highest energy rank (n=4) from among the plurality of types of the main drive pulses P11 to P14 included in the selected drive pulse group G5 (Step S902). From then onward, by performing the same process as shown in FIG. 4, the stepping motor 109 is driven to rotate (Steps S410 to S426).

In the fourth embodiment, an example in which there is one drive pulse group G has been described. However, a plurality of drive pulse groups G may be provided.

As the fixed drive pulse P15, a drive pulse having predetermined energy smaller than the correction drive pulse P2 may be used. As the fixed drive pulse P15, a drive pulse having energy larger than the respective main drive pulses P1 included in the respective drive pulse groups G and smaller than the correction drive pulse P2 may be used.

As described above, the stepping motor control circuit according to the fourth embodiment of the invention includes: the cell 104 as a power supply configured to supply power to at least the stepping motor 109, the voltage detecting unit configured to detect the voltage of the cell 104, the rotation detection determination circuit 114 configured to detect the condition of the rotation of the stepping motor 109, a control unit configured to select the fixed drive pulse P15 having predetermined energy or a drive pulse group G from among at least one drive pulse group G according to the voltage of the cell 104 detected by the above-described voltage detecting unit and select a main drive pulse P1 according to the condition of the rotation of the stepping motor 109 detected by the rotation detection determination circuit 114 from among the plurality of types of main drive pulses P1 included in the drive pulse group G in question when the drive pulse group G is selected, and a drive unit configured to drive the stepping motor 109 to rotate by the above-described fixed drive pulse P15 or the main drive pulse P1 selected by the above-described control unit, and is characterized in that when the above-described control unit selects a main drive pulse P1 initially by selecting the drive pulse group G, the above-described control unit selects a main drive pulse P1 other than the main drive pulse P1 having the smallest energy from among the main drive pulses P1 included in the above-described selected drive pulse group G.

Here, the above-described control unit may be configured to select the fixed drive pulse P15 when the voltage of the cell 104 detected by the voltage detecting unit exceeds the predetermined voltage, select the drive pulse group G according to the voltage of the cell 104, and select a main drive pulse other than the main drive pulse having the smallest energy from among the drive pulse group G in question when the voltage of the cell 104 detected by the above-described voltage detecting unit is equal to or lower than the above-described predetermined voltage.

Therefore, even though the cell having large voltage variations is used, stable driving is enabled. Also, an advantage such that the driving in the high-voltage area may be stabilized is achieved.

In the respective embodiments described above, the power-supply voltage detection circuit 105 is used for detecting the cell voltage. However, a configuration in which whether or not the cell 104 is equal to or higher than the predetermined voltage may be determined by the control circuit 103 according to a pattern of the induced signal VRs obtained when the stepping motor 109 is driven by the drive pulse having predetermined energy (for example, the main drive pulse having the highest energy rank in the drive pulse group) without using the power-supply voltage detection circuit 105 is also applicable.

In other words, the above-described voltage detecting unit may be configured to detect the voltage of the cell 104 on the basis of the condition of the rotation of the stepping motor 109 detected by the rotation detection determination circuit 114 when the stepping motor 109 is driven by the drive pulse having predetermined energy.

Accordingly, the configuration may be simplified. In this case, the rotation detection determination circuit 114 and the control circuit 103 constitute the voltage detecting unit.

Also, although the respective embodiments described above are configured to differentiate the pulse widths of the respective drive pulses P1 and P2 in order to change the energies thereof, the energy of the drive pulse may be changed by constituting the drive pulse of a plurality of comb-shaped pulses and changing the number of the comb-shaped pulses or the duty or by changing the pulse voltage.

The embodiments described above may be applied also to analogue electronic timepieces having a calendar function.

Although an example of the electronic timepiece having a single motor has been described as an application example of the stepping motor, the invention may be applied to electronic timepieces having a plurality of motors such as chronograph timepieces or various kinds of electronic equipments using a motor.

Although the detection term T is configured to have the three terms in the respective embodiments described above, it may also be configured to have at least the two terms.

Although the analogue electronic timepiece has been exemplified as an application example of the stepping motor, the invention may be applied to electronic equipment using a motor.

INDUSTRIAL APPLICABILITY

The stepping motor control circuit according to the invention may be applicable to various electronic instruments using the stepping motor.

The analogue electronic timepiece according to the invention is applicable to various analogue electronic timepieces such as analogue electronic wrist timepieces, or analogue electronic standing clocks.

What is claimed is:

1. A stepping motor control circuit comprising:
   a cell as a power supply configured to supply power to at least a stepping motor,
   a voltage detecting unit configured to detect the voltage of the cell,
   a rotation detecting unit configured to detect the condition of the rotation of the stepping motor,
   a control unit configured to select a drive pulse group corresponding to the voltage of the cell detected by the voltage detecting unit from among a plurality of the drive pulse groups including a plurality of types of main drive pulses, and select a drive pulse according to the condition of the rotation of the stepping motor detected by the rotation detecting unit from among the plurality of types of main drive pulses included in the selected drive pulse group or a correction drive pulse having larger energy than the respective main drive pulses, and
   a drive unit configured to drive the stepping motor to rotate by the drive pulse selected by the control unit,
   wherein when the control unit selects a main drive pulse initially by selecting the drive pulse group, the control unit selects a main drive pulse other than a main drive pulse having the smallest energy from among the main drive pulses included in the selected drive pulse group.

2. The stepping motor control circuit according to claim 1, wherein when the control unit selects a main drive pulse initially by selecting the drive pulse group, the control unit selects a main drive pulse having the largest energy from among the main drive pulses included in the selected drive pulse group.

3. The stepping motor control circuit according to claim 1, wherein the respective pulse groups each include three or more types of main drive pulses, and
   when the control unit selects a main drive pulse initially by selecting the drive pulse group, the control unit selects a main drive pulse having the second largest energy from among the main drive pulses included in the selected drive pulse group.

4. The stepping motor control circuit according to claim 1, wherein the voltage detecting unit detects the voltage of the cell at intervals according to the voltage of the cell.

5. The stepping motor control circuit according to claim 4, wherein the voltage detecting unit detects the voltage of the cell at shorter intervals when the voltage of the cell is high than when the voltage of the cell is low.

6. The stepping motor control circuit according to claim 1, wherein the control unit is configured to lower the rank of the main drive pulse when the driving with an allowance is performed consecutively by a predetermined number of times by the main drive pulse having the same energy, and
   the predetermined number of times is set to a number of times according to the voltage of the cell detected by the voltage detecting unit.

7. The stepping motor control circuit according to claim 6, wherein the predetermined number of times is set to the larger number of times when the voltage of the cell is high than when the voltage of the cell is low.

8. The stepping motor control circuit according to claim 1, wherein when the voltage detecting unit drives the stepping motor by a drive pulse having predetermined energy, the voltage detecting unit detects the voltage of the cell on the basis of the condition of the rotation of the stepping motor detected by the rotation detecting unit.

9. The stepping motor control circuit according to claim 1, wherein the voltage detecting unit detects the voltage of the cell during a predetermined period after the start of the operation of the cell or after the release of reset.

10. The stepping motor control circuit according to claim 1, wherein the cell has a first area showing a large voltage variation proportion per hour and a second area showing the voltage variation proportion per hour smaller than that of the first area.

11. A movement comprising the stepping motor control circuit according to claim 1.

12. An analogue electronic timepiece comprising the movement according to claim 11.

13. A stepping motor control circuit comprising:
    a cell as a power supply configured to supply power to at least a stepping motor;
    a voltage detecting unit configured to detect the voltage of the cell;

a rotation detecting unit configured to detect the condition of the rotation of the stepping motor;

a control unit configured to select a fixed drive pulse having predetermined energy or a drive pulse group from among at least one drive pulse group according to the voltage of the cell detected by the voltage detecting unit, and select a main drive pulse according to the condition of the rotation of the stepping motor detected by the rotation detecting unit from among a plurality of types of the main drive pulses included in the drive pulse group when the drive pulse group is selected; and a drive unit configured to drive the stepping motor to rotate by the fixed drive pulse selected by the control unit or the main drive pulse, wherein when the control unit selects a main drive pulse initially by selecting the drive pulse group, the control unit selects a main drive pulse other than a main drive pulse having the smallest energy from among the main drive pulses included in the selected drive pulse group.

14. The stepping motor control circuit according to claim 13, wherein the control unit selects the fixed drive pulse when the voltage of the cell detected by the voltage detecting unit exceeds a predetermined voltage, and selects a main drive pulse other than the main drive pulse having the smallest energy from the drive pulse group according to the voltage of the cell when the the voltage of the cell detected by the voltage detecting unit is equal to or lower than the predetermined voltage.

15. The stepping motor control circuit according to claim 14, wherein when the control unit selects a main drive pulse initially by selecting the drive pulse group, the control unit selects a main drive pulse having the largest energy from among the main drive pulses included in the selected drive pulse group.

16. The stepping motor control circuit according to claim 14, wherein the respective pulse groups each include three or more types of main drive pulses, and when the control unit selects a main drive pulse initially by selecting the drive pulse group, the control unit selects a main drive pulse having the second largest energy from among the main drive pulses included in the selected drive pulse group.

17. The stepping motor control circuit according to claim 14, wherein the voltage detecting unit detects the voltage of the cell at intervals according to the voltage of the cell.

18. The stepping motor control circuit according to claim 13, wherein when the control unit selects a main drive pulse initially by selecting the drive pulse group, the control unit selects a main drive pulse having the largest energy from among the main drive pulses included in the selected drive pulse

19. The stepping motor control circuit according to claim 13, wherein the respective pulse groups each include three or more types of main drive pulses, and when the control unit selects a main drive pulse initially by selecting the drive pulse group, the control unit selects a main drive pulse having the second largest energy from among the main drive pulses included in the selected drive pulse group.

20. The stepping motor control circuit according to claim 13, wherein the voltage detecting unit detects the voltage of the cell at intervals according to the voltage of the cell.

* * * * *